United States Patent Office 3,740,398
Patented June 19, 1973

3,740,398
BASICALLY SUBSTITUTED 2,4-(1H,3H)-QUINAZO-LINDIONE DERIVATIVES
Rudi Beyerle, Bruchkobel, and Rolf-Eberhard Nitz, Klaus Resag, Eckhard Schraven, and Adolf Stachel, deceased, late of Frankfurt am Main, Fechenheim, by Inge Stachel, Frankfurt am Main, Fechenheim, and Sophie Stachel, heirs, Augsburg, Germany, assignors to Cassella Farbwerke Mainkur Aktiengesellschaft, Frankfurt am Main, Fechenheim, Germany
No Drawing. Filed June 25, 1970, Ser. No. 49,923
Claims priority, application Germany, July 4, 1969,
P 19 34 036.4
Int. Cl. C07d 51/48
U.S. Cl. 260—247.2 A                    6 Claims

ABSTRACT OF THE DISCLOSURE

Pharmacologically valuable, basically substituted 2,4-(1H,3H)-qiunazolidione derivatives having the formula

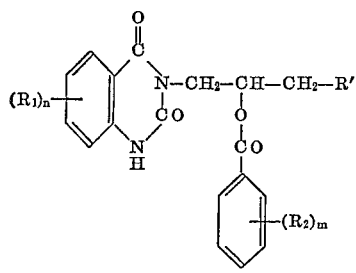

wherein R' is selected from a radical selected from the group consisting of di-$C_1$-$C_4$-alkylamino, N-methylbenzylamino, N-methyl-N-cyclohexylamino, N-methylallylamino, N-methyl-piperazino, N-methyl-N-(piperidino-n-propyl)amino, N-methyl-N-(methoxy-n-propyl)-amino, hexamethyleneimino, morpholino, thiomorpholino, pyrrolidino and piperidino; $R_1$ is methoxy; $R_2$ stands for alkoxy groups having 1–4 carbon atoms; $m$ stands for an integer selected from the groups 1, 2 and 3; and $n$ stands for an integer selected from the groups 2 and 3 having the formula

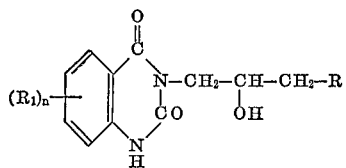

wherein $R_1$ has the above-given meaning, R is identical with R' or, in case R' contains an acyloxy radical of the formula

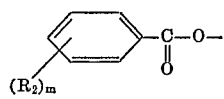

said R may also represent the radical of the underlying hydroxy compound with an alkoxy benzoic acid of the formula

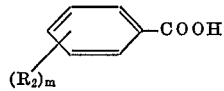

or a functional derivative thereof; or by cyclizing substituted o-aminobenzamides having the formula

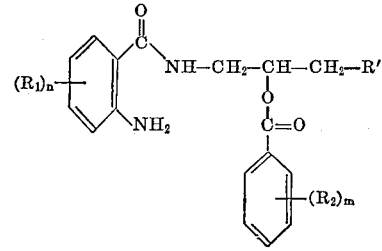

with phosgene or with a lower alkyl chloroformate.

The present invention relates to new, pharmacologically valuable, basically substituted 2,4-(1H,3H)-quinoazolindione derivatives having the formula

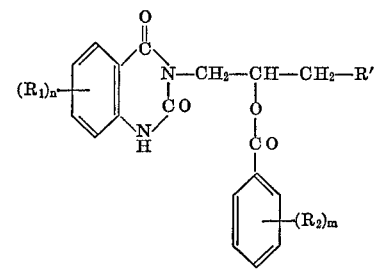

wherein

R' means the radical of a secondary aliphatic, cycloaliphatic, araliphatic amine having 2 to 10 carbon atoms or of a 5, 6 or 7-membered heterocyclic nitrogen base, which contains in the nucleus besides the nitrogen atom a corresponding number of methylene groups as well as further nitrogen atoms, and O or an S atom, said radical being bound via a nitrogen atom, $R_1$ stands for lower alkoxy groups having 1 to 4 carbon atoms which are preferably in the 6,7 or 6,7,8-position, $R_2$ represents alkoxy having 1 to 4 carbon atoms, $m$ stands for the integers 1, 2 or 3 and $n$ means the integers 2 or 3.

Furthermore, the present invention relates to processes for the production of said compounds.

The radical of a secondary amine R' which is bound via a nitrogen atom may derive in the aliphatic series from mono and diamines, such as dialkylamines, alkylalkenylamines, alkylenediamines, hydroxyalkylamines and alkoxyalkylamines.

Such amines are for instance: dimethylamine, diethylamine, allylmethylamine, N,N-diethyl-N'-methylethylenediamine, N,N-diethyl-N'-methylpropylenediamine, N-methylethanolamine, N-methylpropanolamine, N-isopropylethanolamine, N-butylethanolamine, N-benzylethanolamine, N-methylmethoxypropylamine, N-methylethoxypropylamine.

Cycloaliphatic amines may be for instance: N-methylcyclopropylamine, N-methylcyclohexylamine.

Amines of the araliphatic series may be for instance: phenalkylalkylamines such as benzylmethylamine, phenethylmethylamine.

Heterocyclic nitrogen bases may be for instance: 5,6 and 7-membered heterocyclic nitrogen bases such as pyrrolidine, morpholine, thiomorpholine, piperidine, N-methylpiperazine, N-phenylpiperazine, N-($\beta$-hydroxyethyl)-piperazine, N-($\gamma$-hydroxypropyl)-piperazine, hexamethyleneimine.

The 2,4-(1H,3H)-quinoazolindione derivatives of the present invention are obtained (a) by acylating, optionally in the presence of an acid-binding agent, 2,4-(1H,3H)-quinazolindiones of the formula

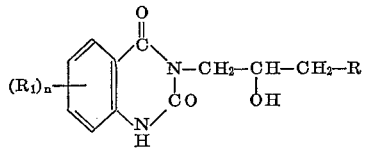

wherein $R_1$ has the above-given meaning, R is identical with R' or, in case R' contains an acyloxy radical of the formula

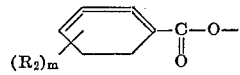

said R may also represent the radical of the underlying hydroxy compound with an alkoxy benzoic acid of the formula

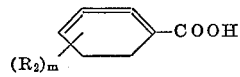

or a functional derivative thereof or (b) by cyclizing substituted o-aminobenzamides of the formula

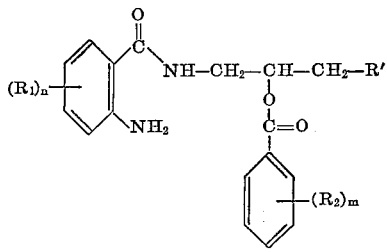

with phosgene or with a lower alkyl chloroformiate.

If, according to the process described under para (a), initial products are used wherein the radical of an amine R, which is bound via a nitrogen atom, contains a hydroxyalkyl group, and if 2 mols of alkoxy benzoic acid or of a functional derivative thereof are employed, one obtains the corresponding diesters. The 3-($\alpha$-amino-$\beta$-hydroxypropyl)2,4-(1H,3H) - quinazolindiones required as starting material for this process may be obtained by various routes of preparation according to the teachings of the corresponding patent application having the same title and the same filing date, i.e., U.S. Ser. No. 49,932, filed June 25, 1970.

The initial products required for the method described under para (b) may be obtained in the usual manner according to analogous processes. As lower alkyl chloroformate it is advisable to use ethyl chloroformate.

The derivatives of the 2,4-(1H,3H)-quinazolindiones according to the present invention are valuable pharmaceuticals. In particular, they are excellent coronary dilators and, in this respect, superior to other known substances of this kind.

With respect to the change in the oxygen tension in the coronary veinous blood, the pharmacological investigation of the vasodilator action on the coronary vessels was carried out in dogs according to the methods described by W. K. A. Schaper and his co-workers (see W. K. A. Schaper, R. Xhonneux, and J. M. Bogaard "Über die kontinuierliche Messung des Sauerstoffdruckes im venösen Coronarblut" (Naunyn-Schmiedeberg's Arch. exp. Path. u. Pharmak. 245, 383–389 (1963)). The test preparations were applied intravenously to the narcotized and spontaneously breathing animals. On these test conditions the dilation of the coronary arteries caused by the test substances along with the increase in the coronary blood flow led to an increase in the oxygen tension in the coronary veinous blood. This oxygen tension was measured according to polarographic methods by means of a platin electrode of the Gleichmann-Lübbers type (see U. Gleichmann and D. W. Luebbers "Die Messung des Sauerstoffdruckes in Gasen and Flüssigkeiten mit der Platin-Elektrode unter besonderer Berücksichtigung der Messung im Blut," Pflügers Arch. 271, 431–455 (1960)). The heart rate was continuously measured by electronic methods from systolic peaks of the arterial blood pressure. The arterial blood pressure was measured in the known manner in the femoral artery with the aid of an electromanometer of the Statham-strain-gauge type.

The following table gives the results of the pharmocological investigations which were carried through. The preparations were tested in the form of their respective hydrochlorides:

For a better understanding of the nature and the objects of this invention, reference should be made to the accompanying examples which are of an illustrative rather than a limiting nature. Unless otherwise stated, all temperatures given are in degrees centigrade.

EXAMPLE 1

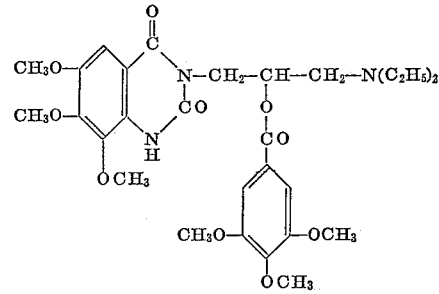

38.1 g. (0.1 mol) 3-$\gamma$-diethylamino-$\beta$-hydroxypropyl)-6-7,8 - trimethoxy - 2,4 - (1H,3H) - quinazolindione are dissolved in 380 cc. chloroform and admixed with 11.1 g. (0.11 mol) triethylamine. Subsequently, while stirring at room temperature, a solution consisting of 25.3 g. (0.11 mol) 3,4,5 - trimethoxybenzoyl chloride in 80 cc. chloroform is added dropwise during 30 minutes and stirring is continued for 1 hour at room temperature. Then the reaction mixture is heated to the boil and stirred for 12 hours under reflux. After cooling down it is evaporated to dryness in vacuo. The residue is dissolved with stirring in dilute hydrochloric acid and the

| Preparation | LD$_{50}$ dosage | | Maximal increase in oxygen tension in the coronary veinous blood, in— | | Maximal change in the heart rate in— | | Maximal change in the blood pressure (systolic/ diastolic) in— | |
|---|---|---|---|---|---|---|---|---|
| | g./kg. mouse i.v. | Mg./kg. i.v. | Percent | Minutes | Percent | Minutes | Percent | Minutes |
| 3-[$\gamma$-diethylamino-$\beta$-(3,4,5-trimethoxybenzoxy)-propyl]-6,7,8-trimethoxy-2,4-(1H,3H)-quinazolindione | 0.14 | 0.2 | +92 | >45 | −11 | >45 | ±0 | |
| 3-[$\gamma$-morpholino-$\beta$-(3,4,5-trimethoxybenzoxy)-propyl]-6,7,8-trimethoxy-2,4-(1H,3H)-quinazolindione | 0.23 | 0.2 | +136 | >20 | +16 | >20 | −47/−42 | >20 |
| 3-[$\gamma$-piperidino-$\beta$-(3,4,5-trimethoxybenzoxy)-propyl]-6,7,8-trimethoxy-2,4-(1H,3H)-quinazolindione | 0.082 | 0.2 | +110 | 45 | −18 | >45 | −13/−19 | >45 |
| 3-[$\gamma$-hexamethyleneimino-$\beta$-(3,4,5-trimethoxybenzoxy)-propyl]-6,7,8-trimethoxy-2,4-(1H,3H)-quinazolindione | 0.063 | 0.2 | +97 | 40 | −13 | >40 | +18/+7 | >40 |
| 3-[$\gamma$-pyrrolidino-$\beta$-(3,4,5-trimethoxybenzoxy-propyl]-6,7,8-trimethoxy-2,4-(1H,3H)-quinazolindione | 0.08 | 0.2 | +67 | 35 | −3 | >35 | −3/−20 | 5 |
| 3-[$\gamma$-(4'-methylpiperazino[1']-$\beta$-(3,4,5-trimethoxybenzoxy)-propyl]-6,7,8-trimethoxy-2,4-(1H,3H)-quinazolindione | 0.17 | 0.2 | +42 | >55 | −9 | >55 | −14/−17 | >55 |
| 3-[$\gamma$-diethylamino-$\beta$-(3,4,5-trimethoxybenzoxy)-propyl]-6,7-dimethoxy-2,4-(1H,3H)-quinazolindione | 0.15 | 0.2 | +26 | >55 | −7 | 55 | −9/−8 | 55 | thusly obtained solution is filtered so as to become limpid. The aqueous hydrochloric acid solution is then rendered alkaline by the introduction of solid potassium carbonate and the oily, separating reaction product is dissolved in ethyl acetate. After drying over potassium carbonate, one obtains by the introduction of anhydrous gaseous hydrogen chloride into the ethyl acetate solution the hydrochloride of the 3 - [γ - diethylamino - β - (3,4,5 - trimethoxybenzoxy)-propyl] - 6,7,8 - trimethoxy - 2,4-(1H,3H) - quinazolindione in the form of colorless needles melting at 191–192°.

Yield: 51 g. (=83.3% of the theoretical)

EXAMPLE 2

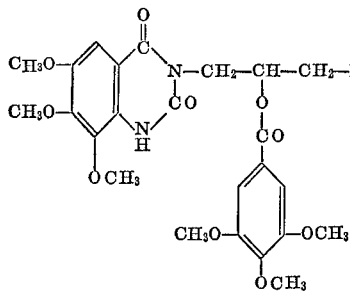

43.8 g. (0.1 mol) 3-[γ-(4' - β - hydroxyethyl-piperazino-[1']) - β - hydroxypropyl] - 6,7,8 - trimethoxy-2,4-(1H,3H) - quinazolindione are suspended with the addition of 22.2 g. (0.22 mol) triethylamine in 400 cc. anhydrous chlorobenzene. A solution consisting of 46 g. (0.2 mol) 3,4,5-trimethoxybenzoyl chloride in 120 cc. chlorobenzene is then added dropwise while stirring at room temperature. Stirring is continued for 1 hour at room temperature and then for 8 hours at 120° Subsequently, the insolute is filtered off and the filtrate is evaporated to dryness in vacuo. The thusly obtained residue is dissolved in dilute hydrochloric acid and the solution is rendered alkaline by the addition of aqueous potassium carbonate. The oily, separating reaction product is then dissolved in ethyl acetate. After drying over potassium carbonate, and introducing gaseous hydrogen chloride, the dihydrochloride of the 3-[γ - (4' - β - 3,4,5 - trimethoxybenzoxyethyl-piperazino-[1']) - β - (3,4,5 - trimethoxybenzoxy)-propyl]-6,7,8 - trimethoxy - 2,4 - (1H,3H) - quinazolindione is precipitated in the form of colorless needles melting at 154–156° Yield: 54 g. (=60% of the theoretical).

Analogously to the descriptions given in Examples 1 and 2 the following compounds of the present invention may be prepared:

General formula:

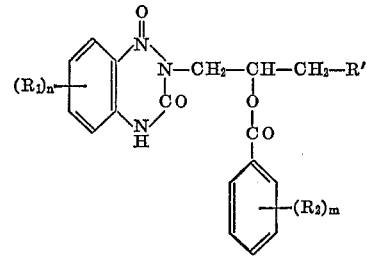

| $(R_1)_n$ | $(R_2)_m$ | R' | Melting point (hydrochloride), degrees |
|---|---|---|---|
| 6,7,8-$(OCH_3)_3$ | 3,4,5-$(OCH_3)_3$ | —N⟨O (morpholino) | 150–152 |
| 6,7,8-$(OCH_3)_3$ | 3,4,5-$(OCH_3)_3$ | —N⟨ (piperidino) | 140–145 |
| 6,7,8-$(OCH_3)_3$ | 3,4,5-$(OCH_3)_3$ | —N⟨ (pyrrolidino) | 155 |
| 6,7,8-$(OCH_3)_3$ | 3,4,5-$(OCH_3)_3$ | —N⟨ (hexamethyleneimino) | 158 |
| 6,7,8-$(OCH_3)_3$ | 3,4,5-$(OCH_3)_3$ | —N⟨N—$CH_3$ | [1] 175 |
| 6,7,8-$(OCH_3)_3$ | 3,4,5-$(OCH_3)_3$ | —N⟨S | [2] 80 |
| 6,7,8-$(OCH_3)_3$ | 3,4,5-$(OCH_3)_3$ | $CH_3$<br>\|<br>—N—$CH_2CH_2CH_2$—O—$CH_3$ | 122–125 |
| 6,7,8-$(OCH_3)_3$ | 3,4,5-$(OCH_3)_3$ | $CH_3$<br>\|<br>—N—$CH_2$—$C_6H_5$ | [2] 90 |
| 6,7,8-$(OCH_3)_3$ | 3,4,5-$(OCH_3)_3$ | $CH_3$<br>\|<br>—N—$CH_2$—CH=$CH_2$ | [2] 120 |

TABLE—Continued

| $(R_1)_n$ | $(R_2)_m$ | R' | Melting point (hydrochloride), degrees |
|---|---|---|---|
| 6,7,8-$(OCH_3)_3$ | 3,4,5-$(OCH_3)_3$ | —N(CH_3)—C_6H_{11} (cyclohexyl) | 116–118 |
| 6,7,8-$(OCH_3)_3$ | 3,4,5-$(OCH_3)_3$ | —N(CH_3)—CH_2CH_2CH_2—N(C_6H_{11}) | [1][2] 90 |
| 6,7,8-$(OCH_3)_3$ | 3,4,5-$(OCH_3)_3$ | —N$(C_4H_9)_2$ | [3] 182–184 |
| 6,7-$(OCH_3)_2$ | 3,4,5-$(OCH_3)_3$ | —N$(C_2H_5)_2$ | [2][3] 90 |

[1] Dihydrochloride.
[2] Decomposition.
[3] Hydrochloride.

EXAMPLE 3

2-nitro-3,4,5-trimethoxy-N-(γ-diethylamino-β-hydroxypropyl)-benzamide 82.6 g. (0.3 mol) 2-nitro - 3,4,5 - trimethoxybenzoyl chloride are dissolved in 200 cc. anhydrous benzene and added dropwise, while stirring, to a solution consisting of 43.8 g. (0.3 mol) γ-diethylamino - β - hydroxypropylamine and 30.3 g. (0.3 mol) triethylamine in 500 cc. anhydrous benzene. Stirring is continued for 3 hours under reflux and after cooling down, the filtrate is evaporated to dryness in vacuo. For further purification purposes the crude product is dissolved in dilute hydrochloric acid and, after filtration, the filtrate is rendered alkaline by the addition of an aqueous potassium carbonate solution. The base which hereby separates in the form of an oil, is dissolved in ethyl acetate and washed several times with water. After drying over potassium carbonate the ethyl acetate solution is concentrated in vacuo and thus obtained is the 2-nitro-3,4,5-trimethoxy - N - (γ - diethylamino - β - hydroxypropyl)-benzamide in the form of a yellowish oil.

Yield: 91 g. (=79% of the theoretical)

2-nitro-3,4,5-trimethoxy-N-[γ-diethylamino-β-(3,4,5-trimethoxybenzoxy)-propyl]-benzamide 38.5 g. (0.1 mol) 2-nitro-3,4,5-trimethoxy-N-(γ-diethylamino-β-hydroxypropyl)-benzamide and 15.15 g. (0.15 mol) triethylamine are dissolved in 200 cc. anhydrous benzene and admixed with stirring with a solution consisting of 34.5 g. (0.15 mol) 3,4,5-trimethoxybenzoyl chloride in 150 cc. anhydrous benzene. Subsequently, the reaction mixture is heated to the boil and stirring is continued for 6 hours under reflux. After cooling down the reaction product is stirred out with 300 cc. water and the benzene layer is separated. Subsequently, the benzene layer is shaken out with dilute hydrochloric acid. The aqueous hydrochloric acid solution is rendered alkaline by the addition of aqueous potassium carbonate solution and the base which separates in the form of an oil is dissolved in ethyl acetate. The thusly obtained ethyl acetate solution is washed with water and evaporated to dryness, after drying over potassium carbonate, in vacuo. For further purification the crude product is recrystallized from alcohol. Thus obtained is the 2-nitro-3,4,5-trimethoxy-N-[γ-diethylamino-β-(3,4,5 - trimethoxybenzoxy)-propyl]-benzamide in the form of light yellow crystals melting at 107°.

Yield: 46 g. (=79.5% of the theoretical)

2-amino-3,4,5-trimethoxy-N-[γ-diethylamino-β-(3,4,5-trimethoxybenzoxy)-propyl]-benzamide 58 g. (0.1 mol) 2-nitro-3,4,5-trimethoxy-N-[γ-diethylamino-β-(3,4,5 - trimethoxybenzoxy)-propyl]-benzamide are dissolved in 250 cc. methanol and hydrogenated at 30–40° in the presence of Raney nickel at a hydrogen pressure of 70 atmospheres. The reaction product is sucked off from the catalyst and the filtrate is evaporated to dryness in vacuo. The oily residue is dissolved in ethyl acetate and by the addition of etheric hydrochloric acid the dihydrochloride of the 2-amino-3,4,5-trimethoxy-N-[γ-diethylamino - β - (3,4,5-trimethoxybenzoxy)propyl]-benzamide is precipitated in the form of colorless needles having a decomposition point of 75°.

Yield: 49 g. (=78.7% of the theoretical)

3-[γ-diethylamino-β-(3,4,5-trimethoxybenzoxy)-propyl]-6,7,8-trimethoxy-2,4-(1H,3H)-quinazolindione 54.9 g. (0.1 mol) 2-amino-3,4,5-trimethoxy-N-[γ-diethylamino-β-(3,4,5 - trimethoxybenzoxy)-propyl]-benzamide and 11 g. sodium carbonate are suspended in 300 cc. chlorobenzene and subsequently admixed dropwise at 40–50° with 12 g. (0.11 mol) ethyl chloroformiate. Then the reaction mixture is stirred for 10 hours at 100°. The inorganic salts are sucked off from the hot reaction mixture and the filtrate is evaporated to dryness in vacuo. The remaining crude product is dissolved for further purification in dilute hydrochloric acid, shaken out several times with ether and then the aqueous hydrochloric acid solution is rendered alkaline by the addition of aqueous potassium carbonate solution. The oily, separating reaction product is dissolved in ethyl acetate and after drying over potassium carbonate one obtains by the introduction of anhydrous hydrogen chloride into the ethyl acetate solution the hydrochloride of the 3-[γ-diethylamino - β - (3,4,5-trimethoxybenzoxy)-propyl]-6,7,8-trimethoxy-2,4-(1H,3H)-quinazolindione in the form of colorless needles melting at 191–192°.

Yield: 38 g. (=62% of the theoretical)

The same product is also obtained by reacting in the usual manner 2-amino - 3,4,5 - trimethoxy-N-(γ-diethylamino - β - 3,4,5 - trimethoxybenzoxy-propyl)-benzamide with phosgene.

What is claimed is:

1. A basically substituted 2,4-(1H,3H)-quinazolindione derivative having the formula

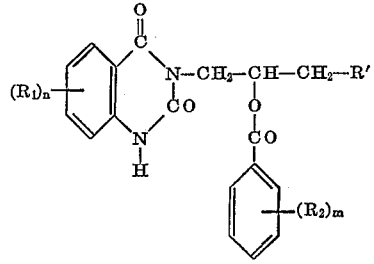

wherein R' stands for a radical selected from the group consisting of di-$C_1$–$C_4$ alkylamino, N - methyl-benzylamino, N-methyl - N - cyclohexylamino, N-methyl-allylamino, N-methyl-piperazino, N-methyl-N-(piperidino-n- propyl)-amino, N-methyl-N-(methoxy-n-propyl)-amino, hexamethylene-imino, morpholino, thiomorpholino, pyrrolidino and piperidine; $R_1$ stands for methoxy; $R_2$ stands for alkoxy groups having 1–4 carbon atoms; $m$ stands for an integer selected from the group consisting of 1, 2 and 3; and $n$ stands for an integer selected from the group consisting of 2 and 3, and the hydrochloric acid addition salts thereof.

2. 3-[γ-diethylamino - β - (3,4,5-trimethoxybenzoxy)-propyl]-6,7,8-trimethoxy - 2,4 - (1H,3H)-quinazolindione, and the hydrochloric acid addition salts thereof.

3. 3-[γ-morpholine-β-(3,4,5 - trimethoxybenzoxy)-propyl]-6,7,8-trimethoxy - 2,4 - (1H,3H)-quinazolindione, and the hydrochloric acid addition salts thereof.

4. 3-[γ-piperidino - β - (3,4,5-trimethoxybenzoxy)-propyl]-6,7,8-trimethoxy-2,4-(1H,3H)-quinazolindione, and the hydrochloric acid addition salts thereof.

5. 3-[γ-hexamethyleneimino - β - (3,4,5-trimethoxy)-propyl]-6,7,8-trimethoxy - 2,4 - (1H,3H)-quinazolindione, and the hydrochloric acid addition salts thereof.

6. 3-[γ-pyrrolidino-β-(3,4,5 - trimethoxybenzoxy)-propyl]-6,7,8-trimethoxy-2,4-(1H,3H)-quinazolindione, and the hydrochloric acid addition salts thereof.

References Cited

UNITED STATES PATENTS 3,274,194   9/1966   Hayao _____ 260—256.4

ALEX MAZEL, Primary Examiner

R. V. RUSH, Assistant Examiner

U.S. Cl. X.R.

260—243 B, 256.4 Q, 999